US012122394B2

(12) United States Patent
Kobayashi et al.

(10) Patent No.: US 12,122,394 B2
(45) Date of Patent: *Oct. 22, 2024

(54) INFORMATION COLLECTION SYSTEM (71) Applicant: TOYOTA JIDOSHA KABUSHIKI KAISHA, Toyota (JP)

(72) Inventors: Ayano Kobayashi, Nagoya (JP); Yasuhide Kurimoto, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,616

(22) Filed: Oct. 2, 2023

(65) Prior Publication Data
US 2024/0025419 A1    Jan. 25, 2024

Related U.S. Application Data (63) Continuation of application No. 17/590,158, filed on Feb. 1, 2022, now Pat. No. 11,814,028.

(30) Foreign Application Priority Data

Feb. 24, 2021  (JP) .................. 2021-027352

(51) Int. Cl.
*B60W 40/09* (2012.01)
*B60W 20/20* (2016.01)
*B60W 40/08* (2012.01)

(52) U.S. Cl.
CPC ............ *B60W 40/09* (2013.01); *B60W 20/20* (2013.01); *B60W 2040/0809* (2013.01); *B60W 2554/4041* (2020.02)

(58) Field of Classification Search
CPC ................. B60W 40/09; B60W 20/20; B60W 2554/4041; B60W 2040/0809
See application file for complete search history.

(56) References Cited

U.S. PATENT DOCUMENTS 9,475,402 B2 * 10/2016 Won .................... G01C 21/3469
2014/0225571 A1    8/2014 Obata et al.
(Continued)

FOREIGN PATENT DOCUMENTS

JP        2018-181323 A    11/2018
WO       2013/046263 A1    4/2013

OTHER PUBLICATIONS

Notice of Allowance dated Jul. 19, 2023, Issued to U.S. Appl. No. 17/590,158, filed Feb. 1, 2022.

*Primary Examiner* — Ramsey Refai
(74) *Attorney, Agent, or Firm* — Dinsmore & Shohl LLP (57) ABSTRACT

An information collection system corrects vehicle state information of each of a plurality of vehicles. Identification information and the vehicle state information is transmitted by a first transmitter, the identification information being information based on which a target vehicle is specified from among the vehicles. Disclosure position information and the identification information are transmitted by a second transmitter, the disclosure position information being set as position information on the target vehicle based on (i) alternative position information indicating a position of the target vehicle in an alternative manner and (ii) disclosure information indicating a disclosure range to disclose the alternative position information. The information collection system includes: an acquisition portion configured to acquire the identification information, the vehicle state information, and the disclosure position information; and a computing device configured to associate the vehicle state information with the disclosure position information based on the identification information.

4 Claims, 8 Drawing Sheets

(56) References Cited

U.S. PATENT DOCUMENTS

| | | | |
|---|---|---|---|
| 2015/0134167 A1* | 5/2015 | Won | B60L 55/00 701/29.3 |
| 2015/0268308 A1* | 9/2015 | Nakayama | B60L 58/16 702/50 |
| 2018/0308300 A1 | 10/2018 | Kurimoto | |

* cited by examiner

| VEHICLE ID | TRANSMITTER ID | I1(1) |
| VEHICLE ID | TRANSMITTER ID | I1(2) |

⋮

| VEHICLE ID | TRANSMITTER ID | I1(10) |
| VEHICLE ID | TRANSMITTER ID | I1(20) |

⋮

| VEHICLE ID | TRANSMITTER ID | I1(n) |

FIG. 4

CUSTOMER INFORMATION

| VEHICLE ID | TRANS-MITTER ID | ADDRESS INFORMATION LI1 | SHOP ADDRESS INFORMATION LI2 | DISCLOSURE INFORMATION OI | I3(1) |
|---|---|---|---|---|---|
| | | | I5 | | |

⋮

| VEHICLE ID | TRANS-MITTER ID | ADDRESS INFORMATION LI1 | SHOP ADDRESS INFORMATION LI2 | DISCLOSURE INFORMATION OI | I3(10) |
| | | | I5 | | |

⋮

| VEHICLE ID | TRANS-MITTER ID | ADDRESS INFORMATION LI1 | SHOP ADDRESS INFORMATION LI2 | DISCLOSURE INFORMATION OI | I3(n) |
| | | | I5 | | |

| VEHICLE ID | TRANSMITTER ID | BATTERY INFORMATION $B_1$ | TIME INFORMATION $t_1$ | — $y(1)$ |
| VEHICLE ID | TRANSMITTER ID | BATTERY INFORMATION $B_2$ | TIME INFORMATION $t_2$ | — $y(2)$ |
| ⋮ | | | | |
| VEHICLE ID | TRANSMITTER ID | BATTERY INFORMATION $B_n$ | TIME INFORMATION $t_n$ | — $y(n)$ |

| VEHICLE ID | TRANSMITTER ID | DISCLOSURE POSITION INFORMATION LI3 | — I6(1) |
| VEHICLE ID | TRANSMITTER ID | DISCLOSURE POSITION INFORMATION LI3 | — I6(1) |
| ⋮ | | | |
| VEHICLE ID | TRANSMITTER ID | DISCLOSURE POSITION INFORMATION LI3 | — I6(10) |
| VEHICLE ID | TRANSMITTER ID | DISCLOSURE POSITION INFORMATION LI3 | — I6(20) |
| ⋮ | | | |
| VEHICLE ID | TRANSMITTER ID | DISCLOSURE POSITION INFORMATION LI3 | — I6(n) |

FIG. 11

STORE IN BATTERY INFORMATION DATABASE 311

INFORMATION COLLECTION SYSTEM

CROSS-REFERENCE TO RELATED APPLICATION

This application is a continuation of U.S. patent application Ser. No. 17/590,158 filed Feb. 1, 2022, which claims priority to Japanese Patent Application No. 2021-027352 filed on Feb. 24, 2021, which are incorporated herein by reference in their entirety.

BACKGROUND

1. Technical Field

This disclosure relates to an information collection system.

2. Description of Related Art

In recent years, hybrid vehicles and electric vehicles have been widely used. Power storage devices for running that are provided in these vehicles can deteriorate over time or due to repetition of charge and discharge. Accordingly, in order to accurately estimate the deterioration state of a power storage device, it is conceivable that "power storage device information" on the condition or the usage state of the power storage device is collected in a server provided outside a vehicle. By collecting and analyzing the power storage device information by the server, it is possible to estimate the life of the power storage device or find a defect of the power storage device at an early stage.

However, in a case where the accuracy of position information on the vehicle is high, an excessively specific driving history of the vehicle (in other words, information on a travel route of a user) is to be collected, and this can cause such a concern that the privacy of the user is not protected sufficiently.

In view of this, in an information collection system described in Japanese Unexamined Patent Application Publication No. 2018-181323 (JP 2018-181323 A), at least part of user address information is associated with "battery information" as position information on a vehicle 10.

SUMMARY

In the information collection system, at least part of the user address information is disclosed to a third party, but it is presumable that an allowable range to disclose an address varies depending on users.

This disclosure is accomplished in view of the above problems, and an object of this disclosure is to provide an information collection system in which vehicle state information on a vehicle is collected in consideration of a disclosure range of position information that varies depending on users.

An information collection system according to this disclosure is an information collection system for collecting vehicle state information on each of a plurality of vehicles. Identification information and the vehicle state information are transmitted by a first transmitter, the identification information being information based on which a target vehicle is specified from among the vehicles. Disclosure position information and the identification information are transmitted by a second transmitter, the disclosure position information being set as position information on the target vehicle based on alternative position information and disclosure information, the alternative position information indicating a position of the target vehicle in an alternative manner, the disclosure information indicating a disclosure range to disclose the alternative position information. The information collection system includes an acquisition portion and a computing device. The acquisition portion is configured to acquire the identification information, the vehicle state information, and the disclosure position information. The computing device is configured to associate the vehicle state information with the disclosure position information based on the identification information.

With the information collection system, the vehicle state information on the vehicle can be collected in consideration of the disclosure range of the position information, the disclosure range varying depending on users.

The alternative position information may be at least either one of an address of a user of the target vehicle and an address of a dealer where the user has purchased the target vehicle. The address of the user and the address of the dealer may be expressed by a zip code. The disclosure position information may include information indicating the number of digits of the zip code to be disclosed.

With the information disclosure system according to this disclosure, the vehicle state information on the vehicle can be collected in consideration of the disclosure range of the position information, the disclosure range varying depending on users.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
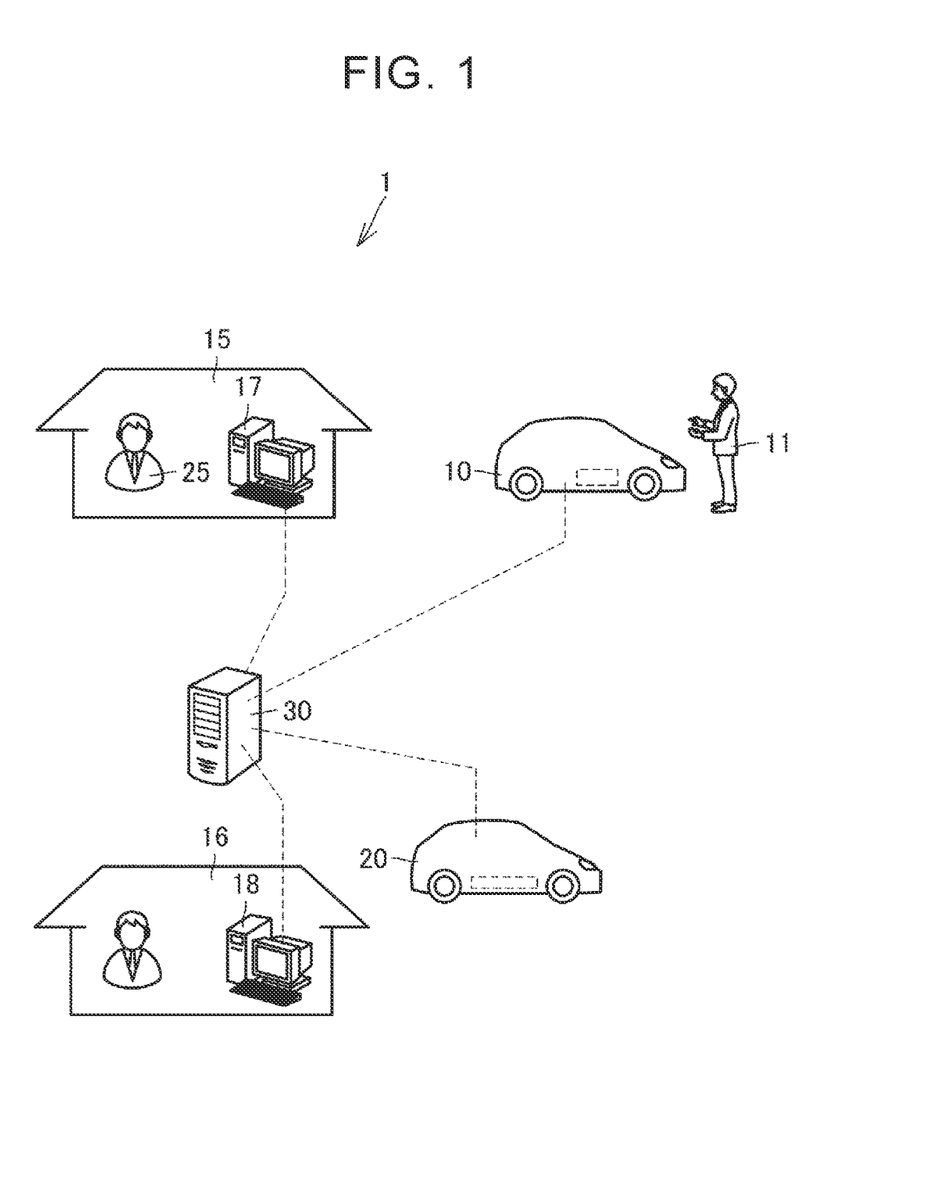
FIG. 1 is a schematic view schematically illustrating an information collection system 1 according to the present embodiment.

With reference to FIGS. 1 to 11, the following describes an information collection system 1 according to the present embodiment. Among constituents illustrated in FIGS. 1 to 11, the same or substantially the same constituent has the same reference sign, and redundant descriptions are omitted. Configuration of Battery Information Collection System FIG. 1 is a schematic view schematically illustrating an information collection system 1 according to the present embodiment. The information collection system 1 includes a vehicle 10, a plurality of vehicles 20, a terminal 17 of a dealer 15, a terminal 18 of a dealer 16, and a server 30.

The vehicles 10, 20 are electric vehicles. The vehicle 10 and the vehicles 20 are configured to be communicable to or mutually with the server 30. Hereby, the server collects vehicle state information (battery information) of an assembled battery 110 from each of the vehicle 10 and the vehicles 20.

The dealer 15 is a dealer to sell the vehicle 10, and the dealer 16 is a dealer to sell the vehicles 20. The dealer 15 is provided with the terminal 17, and the dealer 16 is provided with the terminal 18. Note that the vehicle 10 is purchased by a purchaser 11 in the dealer 15.

The terminals 17, 18 are configured to be communicable to or mutually communicable with the server 30. The terminals 17, 18 transmit various pieces of information input therein to the server 30.

Figure 2:
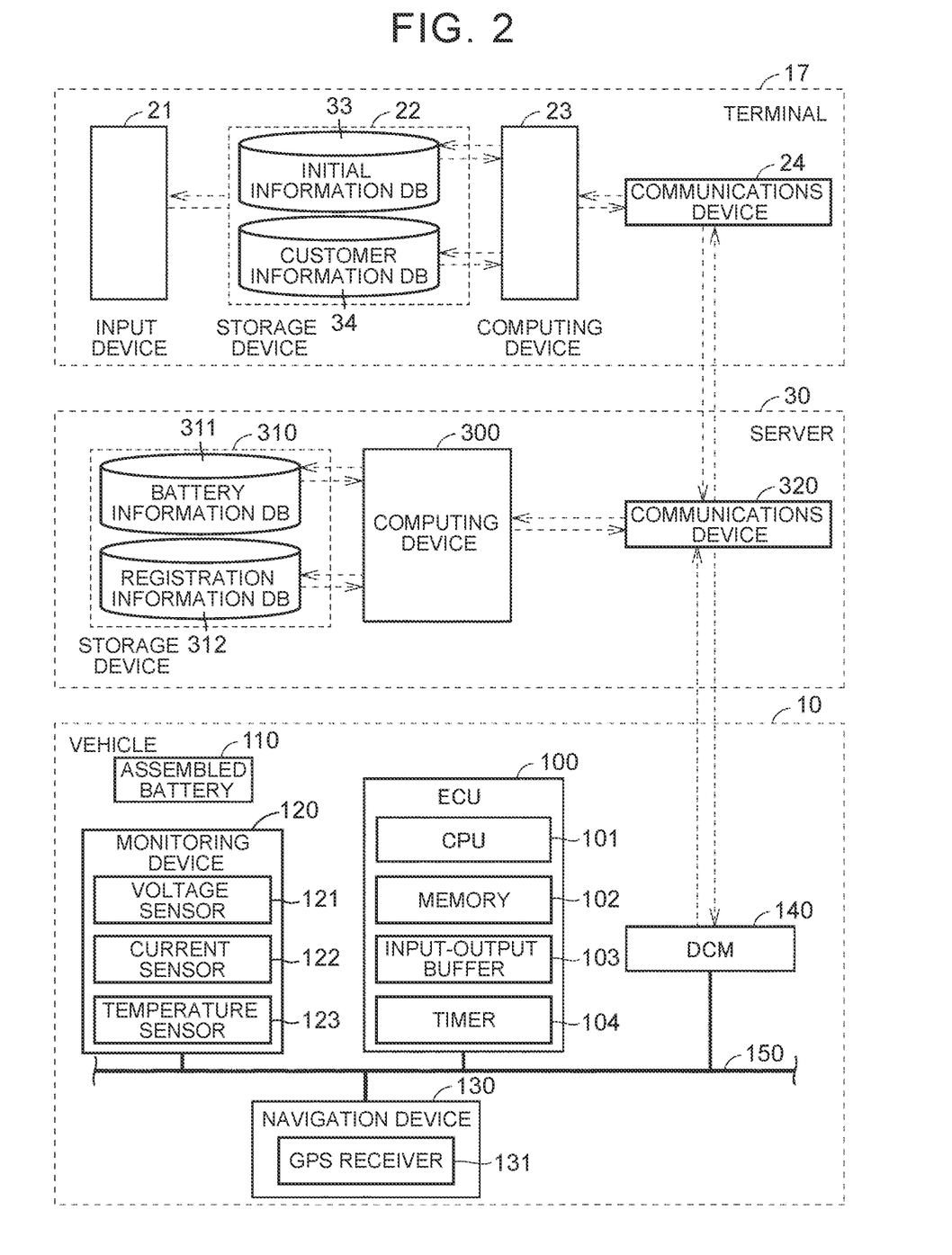
FIG. 2 is a view more specifically illustrating a configuration of the information collection system 1.

FIG. 2 is a view more specifically illustrating a configuration of the information collection system 1. The terminal 17 and the terminal 18 have basically the same configuration. Each of the vehicles 20 has basically the same configuration as the vehicle 10. In view of this, the terminal 18 and the vehicle 20 are omitted in FIG. 2, and the configurations of the terminal 17 and the vehicle 10 will be mainly described.

The vehicle 10 includes an electronic control unit (ECU) 100, an assembled battery 110, a monitoring device 120, a navigation device 130, and a communications module 140. The ECU 100, the monitoring device 120, the navigation device 130, and the communications module 140 are connected to each other via a wired in-vehicle network 150 such as a controller area network (CAN).

As described above, the assembled battery 110 is constituted by a plurality of cells (not illustrated) such as a lithium-ion secondary battery or a nickel-metal hydride battery. Although not illustrated herein, the assembled battery 110 supplies electric power for driving to a motor generator via a power control unit (PCU). The motor generator can also generate electric power by regenerative braking. Alternating-current power generated by the motor generator is converted into direct-current power by the power control unit and is charged to the assembled battery 110.

The monitoring device 120 is provided to monitor the state of the assembled battery 110 and includes a voltage sensor 121, a current sensor 122, and a temperature sensor 123. The voltage sensor 121 detects a voltage Vb of the assembled battery 110. The current sensor 122 detects a current Ib input to and output from the assembled battery 110. The temperature sensor 123 detects a temperature Tb of the assembled battery 110. Respective detection results from the sensors are transmitted to the ECU 100 via the in-vehicle network 150.

The navigation device 130 includes a GPS receiver 131 configured to specify the position of the vehicle 10 based on radio waves from an artificial satellite (not illustrated). The navigation device 130 executes various navigation processes in the vehicle 10 by use of position information (GPS information) on the vehicle 10 that is specified by the GPS receiver 131. More specifically, the navigation device 130 displays a current position of the vehicle 10 on a navigator screen (not illustrated) such that the current position is superimposed on a road map around the vehicle 10, based on the GPS information on the vehicle 10 and road map data stored in a memory (not illustrated). Further, the navigation device 130 guides a recommended route from the current position of the vehicle 10 to a destination. The position information on the vehicle 10 is also output to the ECU 100 via the in-vehicle network 150.

The communications module 140 is an in-vehicle data communication module (DCM) and is configured such that the ECU 100 and the server 30 are mutually communicable with each other. A communication method of the communications module 140 is not particularly limited and may be, for example, fifth-generation mobile communications or a communication method with a relatively low communication speed such as third-generation mobile communications. Note that, in Embodiment 1, the communications module 140 corresponds to a "transmitter" according to this disclosure.

The ECU 100 includes a central processing unit (CPU) 101, a memory 102, an input-output buffer 103, and a timer 104. The ECU 100 controls a PCU (not illustrated) based on a detection result from the monitoring device 120 such that desired charge and discharge is performed on the assembled battery 110, and the ECU 100 also generates "battery information."

The battery information indicates overall information on the condition of the assembled battery 110 and its usage state. Although details are described later, the battery information can include pieces of information (voltage information, current information, and temperature information) detected by the sensors included in the monitoring device 120, and state-of-charge (SOC) information on the assembled battery 110 that is estimated based on the pieces of information, as one example. The battery information generated by the ECU 100 is transmitted to the server 30 via the communications module 140. Note that details of the battery information will be described later. Further, the present embodiment deals with an example in which the "battery information" is employed as one example of the "vehicle state information," but the "vehicle state information" may be information on an engine, and the like.

The terminal 17 includes an input device 21, a storage device 22, and a computing device 23. The input device 21 is a device to be operated by an operator 25 of the dealer 15 such that various pieces of information is input into the terminal 17 via the input device 21.

An initial information database 33 and a customer information database 34 are stored in the storage device 22. Initial information I1 on a vehicle handled in the dealer 16 is stored in the initial information database 33. Information on a purchaser who has purchased a vehicle in the dealer 16 is stored in the customer information database 34.

Figure 3:
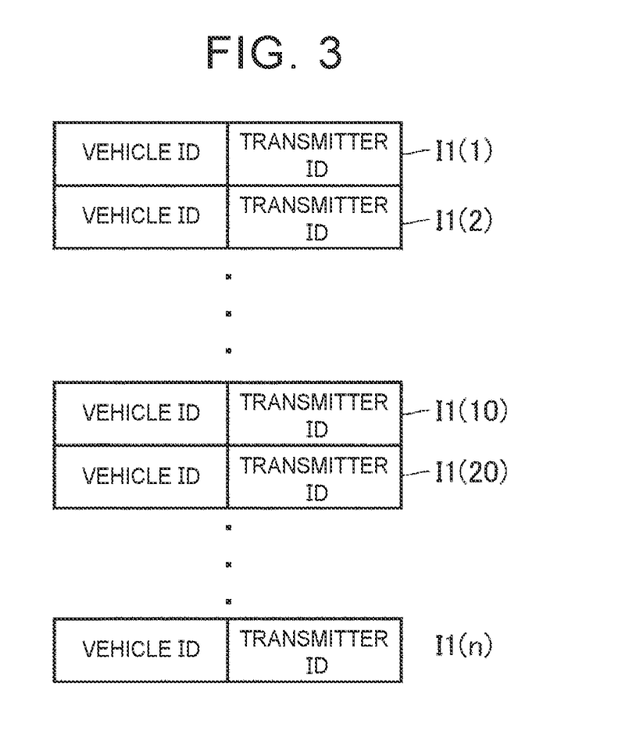
FIG. 3 is a schematic view schematically illustrating an initial information database 33.

FIG. 3 is a schematic view schematically illustrating the initial information database 33. The initial information database 33 includes pieces of initial information I1 of vehicles. Each initial information I1 includes a vehicle ID and a transmitter (identification information) ID of the communications module 140. Note that, in FIG. 3, initial information I1(10) indicates initial information on the vehicle 10.

The initial information I1 is input via the input device 21 by the operator 25 of the dealer 15 and stored in the storage device 22.

Figure 4:
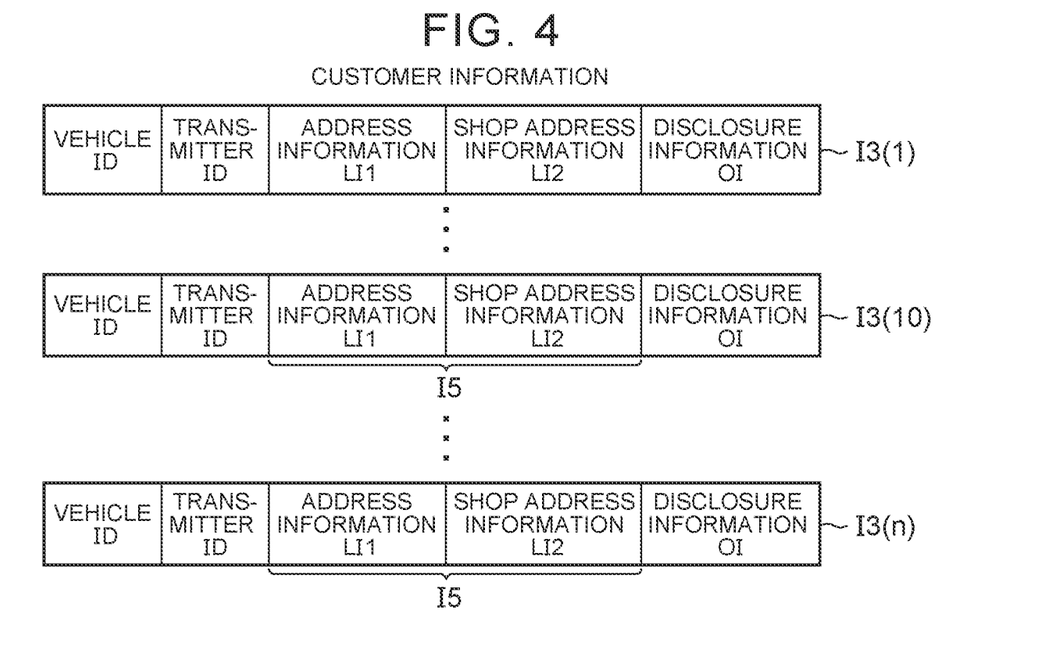
FIG. 4 is a schematic view schematically illustrating a customer information database 34.

FIG. 4 is a schematic view schematically illustrating the customer information database 34. A plurality of pieces of customer information I3 is stored in the customer information database 34. For example, customer information I3(10) is customer information on a purchaser 11 who has purchased the vehicle 10. The customer information I3 includes a vehicle ID of a purchased vehicle, a transmitter ID, address information LI1 on a purchaser, shop address information LI2 on a dealer where the vehicle is purchased, and disclosure information CH.

The purchaser determines a range to disclose the address information LI1 and the shop address information LI2 and which one of the address information LI1 and the shop address information LI2 is to be disclosed at the time when a third party uses information on the purchased vehicle 10. The disclosure information OI includes, as position information on the vehicle 10, the range to disclose the address information LI1 and the shop address information LI2, and the information defining which one of the address information LI1 and the shop address information LI2 is to be disclosed. In the present embodiment, the address information LI1 and the shop address information LI2 are expressed in the form of a zip code. Note that the zip code is one example, and the address information LI1 and the shop address information LI2 may be expressed in the form of other values.

Figure 5:
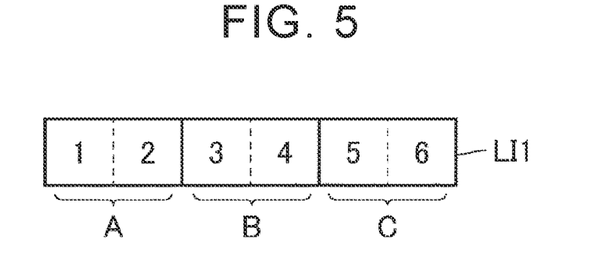
FIG. 5 is a view schematically illustrating an example in which address information LI1 is written.

FIG. 5 is a view schematically illustrating an example in which the address information LI1 is written. In the example illustrated in FIG. 5, the address information LI1 is expressed by a six-digit value. A first two-digit value A indicates a "province," for example. A value B indicates a "city," and a value C indicates a "town." Note that the shop address information LI2 is also written similarly to the address information LI1.

Figure 6:
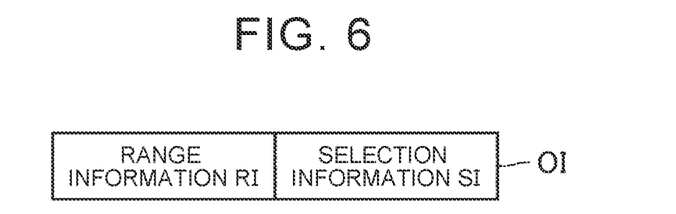
FIG. 6 is a schematic view schematically illustrating disclosure information OI.

FIG. 6 is a schematic view schematically illustrating the disclosure information OI. The disclosure information OI includes range information RI and selection information SI. The selection information SI is information indicative of which one of the address information LI1 and the shop address information LI2 is to be disclosed to a third party as the position information on the vehicle. The range information RI is information indicative of the number of digits to be disclosed in the zip code of a selected address.

The purchaser 11 can select which one of the address information LI1 and the shop address information LI2 is to be disclosed to a third party as the position information on the purchased vehicle 10. Accordingly, when the purchaser 11 uses the vehicle 10, it is possible to restrain the third party from knowing the current position, the travel route, and so on of the vehicle 10.

As such, the address information LI1 and the shop address information LI2 are "alternative position information I5" indicating the position of the vehicle 10 in an alternative manner. Note that, in the present embodiment, the address information LI1 and the shop address information LI2 are both included as the alternative position information I5, but the alternative position information I5 may be at least either one of the address information LI1 and the shop address information LI2.

The purchaser 11 can select a range to be disclosed from a plurality of options. A first option is an option to disclose only the value A. A second option is an option to disclose the value A and the value B (the value C is not disclosed). A third option is an option to disclose the values A, B, C. In the range information RI, information on the option selected by the purchaser 11 is stored.

The content of the disclosure information OI is determined by the purchaser who purchases the vehicle. When the purchaser 11 purchases the vehicle 10, the operator 25 of the dealer 15 inputs the content of the disclosure information OI into the terminal 17. The disclosure information OI thus input is accumulated in the customer information database 34.

Here, the computing device 23 generates disclosure position information LI3 based on the alternative position information I5 and the disclosure information CH.

Figure 7:
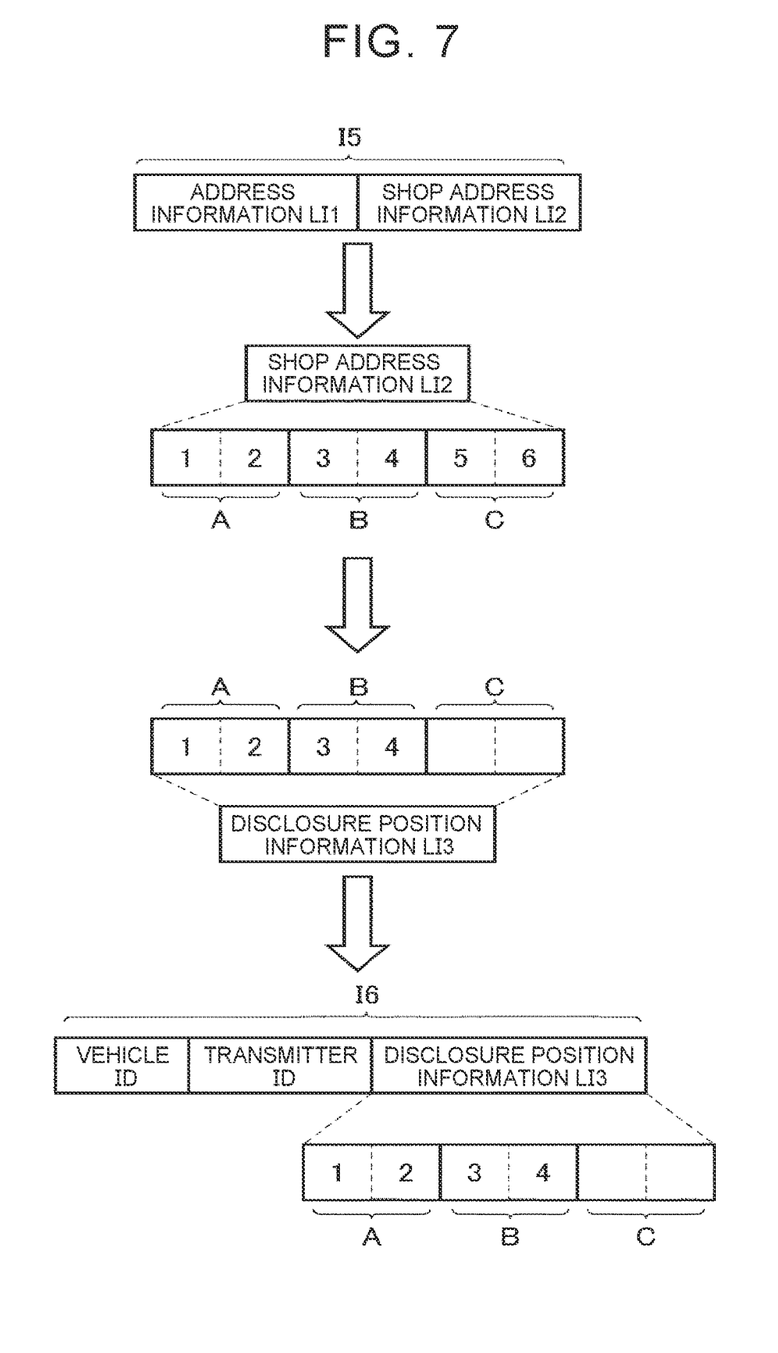
FIG. 7 is a first example schematically illustrating a generation course of disclosure position information LI3.

FIG. 7 is a first example schematically illustrating a generation course of the disclosure position information LI3. In the example illustrated in FIG. 7, the shop address information LI2 is selected as the selection information SI, and the second option is selected as the range information RI. The computing device 23 deletes the address information LI1 from the alternative position information I5. Then, the value C of the address information LI1 is made blank.

Thus, the computing device 23 generates the disclosure position information LI3. Then, the computing device 23 generates registration information I6 by combining the disclosure position information LI3 with the vehicle ID and the transmitter ID of the vehicle.

Figure 8:
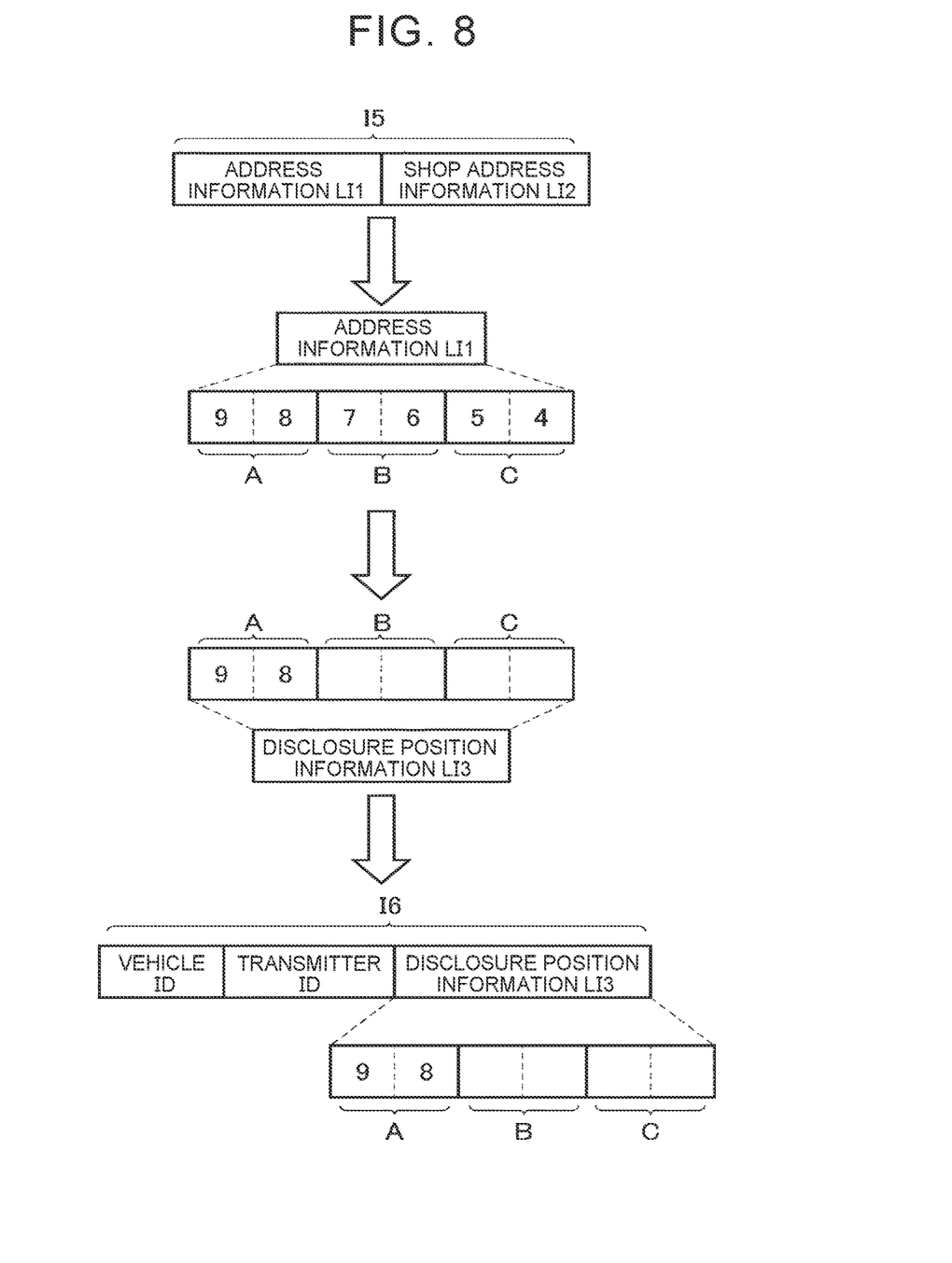
FIG. 8 is a second example schematically illustrating the generation course of the disclosure position information LI3.

FIG. 8 is a second example schematically illustrating the generation course of the disclosure position information LI3. Here, in the example illustrated in FIG. 8, the address information LI1 is selected the selection information SI, and the first option is selected as the range information RI.

The computing device 23 deletes the shop address information LI2. Then, the value A and the value B in the address information LI1 are made blank.

Then, the computing device 23 generates the disclosure position information LI3. Then, the computing device 23 generates the registration information I6 by combining the disclosure position information LI3 with the vehicle ID and the transmitter ID of the vehicle.

Referring back to FIG. 2, the computing device 23 transmits the registration information I6 from the communications device 24 to the server 30.

The server 30 further includes a computing device 300 as an application server, a storage device 310, and a communications device 320, for example. The storage device 310 includes a battery information database 311 and a registration information database 312 each as a database server.

In accordance with an instruction from the computing device 300, associative information X in which battery information (records) on the assembled battery 110 that is received from the ECU 100 of the vehicle 10 is associated with the disclosure position information LI3 on the vehicle 10 is stored in the battery information database 311. Note that details of the associative information X will be described later.

The communications device 320 is configured to be mutually communicable with the communications module 140 provided in the vehicle 10. The computing device 300 collects battery information on the vehicle 10 via the communications device 320 and stores the battery information thus collected in the battery information database 311. The following describes the battery information more specifically.

Battery Information

The battery information can include information on an index value indicative of a degree of deterioration progress of the assembled battery 110 in addition to the voltage information, the current information, the temperature information, and the SOC information.

Generally, as deterioration of an assembled battery progresses over time or due to repetition of charge and discharge, a full charge capacity of the assembled battery decreases or an internal resistance of the assembled battery increases. Accordingly, the battery information may include either or both of the full charge capacity and the internal resistance of the assembled battery 110 as an index value indicative of a deterioration degree of the assembled battery 110. Well-known techniques can be used as calculation techniques of the full charge capacity and the internal resistance of the assembled battery, and therefore, the calculation techniques of the full charge capacity and the internal resistance are not described herein.

Further, in a case where the assembled battery 110 is an assembled battery constituted by a lithium-ion secondary battery, continuous charge and discharge with a heavy current can cause deterioration (so-called high-rate deterioration) due to a deviation in a concentration distribution of lithium ions in an electrolytic solution. A progress degree of the high-rate deterioration is evaluable quantitatively (more specifically, see WO 2013/046263, for example). The battery information may include information on an evaluation value indicative of a progress degree of high-rate deterioration of the assembled battery 110.

By collecting, as the battery information, information on the index value (an index value indicative of the full charge capacity, the internal resistance, or the high-rate deterioration) indicative of the progress degree of the deterioration of the assembled battery 110, it is possible to provide, to a user, a service to estimate the life of the assembled battery 110 or to find a defect of the assembled battery 110 at an early stage. For example, in a case where the deterioration of the assembled battery 110 progresses to some extent, it is possible to propose that the user should have the assembled battery 110 inspected. Further, in a case where the deterioration of the assembled battery 110 further progresses, it is possible to propose replacement of the assembled battery 110 to the user.

Further, it is also possible to determine what kind of processing should be performed on the collected assembled battery 110, based on the battery information. For example, in a case where the index value indicates that the deterioration of the assembled battery 110 does not relatively progress, it is possible to determine that the collected assembled battery 110 is recycled (reused or rebuilt) after the collected assembled battery 110 is subjected to maintenance (e.g., after s performance recovering process to restore the full charge capacity is performed). In the meantime, in a case where the index value indicates that the deterioration of the assembled battery 110 largely progresses, it is possible to determine that the collected assembled battery 110 is for resource recycling.

Note that, in terms of an assembled battery (another assembled battery for replacement) to be newly provided in replacement of the collected assembled battery 110, the server 30 may include other databases (not illustrated) in which information on recycled products (reused products or rebuilt products) is stored.

As such, in a case where the assembled battery 110 is subjected to inspection, collection, replacement, reuse, or the like, it is desirable to collect the position information on the vehicle in addition to the battery information. By collecting the position information on the vehicle, it is possible to make a supply and demand plan to find, for example, in which area assembled batteries can be collected, how many assembled batteries can be collected, and how many new assembled batteries should be prepared for that.

Further, the battery information is utilizable to improve existing assembled batteries or to develop new assembled batteries. A usage environment of the assembled battery can be estimated from the position information on the vehicle. Accordingly, it is also desirable to collect the position information for this purpose. More specifically, from the position information on the vehicle, it is possible to estimate a temperature load to the assembled battery, e.g., that a usage area where the assembled battery is used belongs to a high-temperature or low-temperature area or that the usage area belongs to an area having a large temperature difference between day and night. Further, from the position information on the vehicle, it is also possible to estimate a charge-discharge load to the assembled battery, e.g., that the usage area of the assembled battery belongs to an area where the vehicle is easily accelerated rapidly or easily decelerated rapidly (that is, an area where the assembled battery is easily charged or discharged rapidly). By considering such a load to the assembled battery, it is possible to improve or develop the assembled battery appropriately.

Note that, in a case where the vehicles 10, 20 are plug-in hybrid vehicles or electric vehicles and are configured to be chargeable (so-called plug-in charge) by use of electric power supplied from a charging station or the like (not illustrated), the battery information may include information on a charged power amount at the time of plug-in charge.

The following describes a data format of collection data to be collected from the vehicle 10, 20 in the information collection system 1 according to Embodiment 1.

Generally, at the time when the battery information is collected, it is conceivable to also collect the position information on the vehicle 10, 20 as described above.

However, in order to collect the position information on the vehicle, consent (agreement) of the user is required from the viewpoint of privacy protection for the user. In a case where position information with high accuracy such as GPS information is used, an excessively detailed driving history (in other words, information on the travel route of the user) is collected, and this can cause such a concern that the privacy of the user is not protected sufficiently.

Meanwhile, the above purpose of the battery information does not often require highly accurate position information like the GPS information. Generally, as the moving range of the vehicle 10, the vehicle 10 often travels within a predetermined range around the address of the purchaser 11 or the address of the dealer 15. In view of this, in the present embodiment, the alternative position information I5 is used instead of current position information on the vehicle 10.

Figure 9:
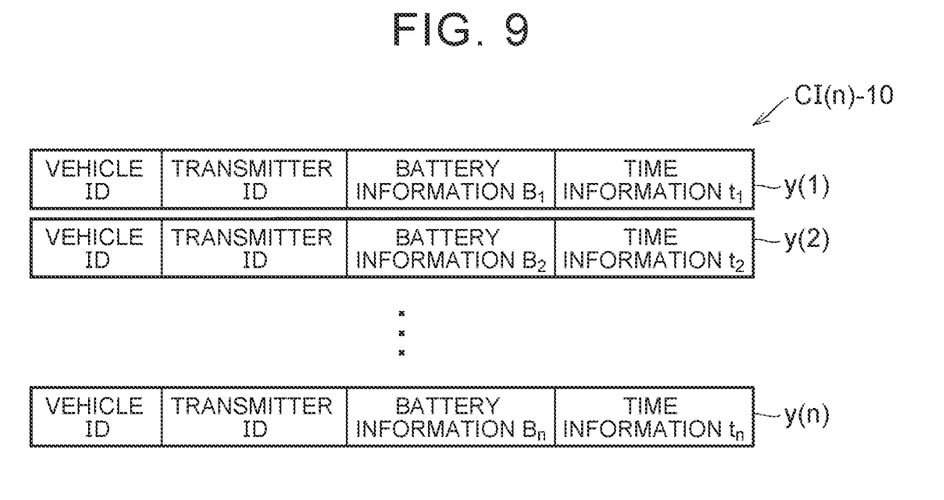
FIG. 9 is a view illustrating an example of a data format of collected data CI(n)-10 in Embodiment 1.

FIG. 9 is a view illustrating an example of the data format of collected data CI(n)-10 in Embodiment 1. Referring now to FIG. 9, collected data CI(n)-10 in Embodiment 1 is constituted by a plurality of records sequentially acquired at every predetermined cycle (e.g., once every 30 seconds), for example. Here, the nth acquired record is expressed as "y(n)."

A record y includes the transmitter ID as identification information on the communications module 140, the vehicle ID, battery information Bn on the assembled battery 110, and time information to indicative of time when the battery information Bn is acquired. Note that it is not necessary for the vehicle side to give time information t to battery information, and the time when the server 30 receives the battery information may be given as the time information t.

When a predetermined number of records y is accumulated and the collected data CI(n)-10 is generated, the vehicle 10 transmits collected data CI to the server 30.

Note that the collected data CI is transmitted regularly. Collected data CI(1) indicates the first transmitted collected data, and collected data CI(n) indicates the nth transmitted collected data. Collected data CI(k)-10 indicates the kth collected data transmitted from the vehicle 10. For example, collected data CI(m)-20 indicates the mth collected data transmitted from the vehicle 20.

Figure 10:
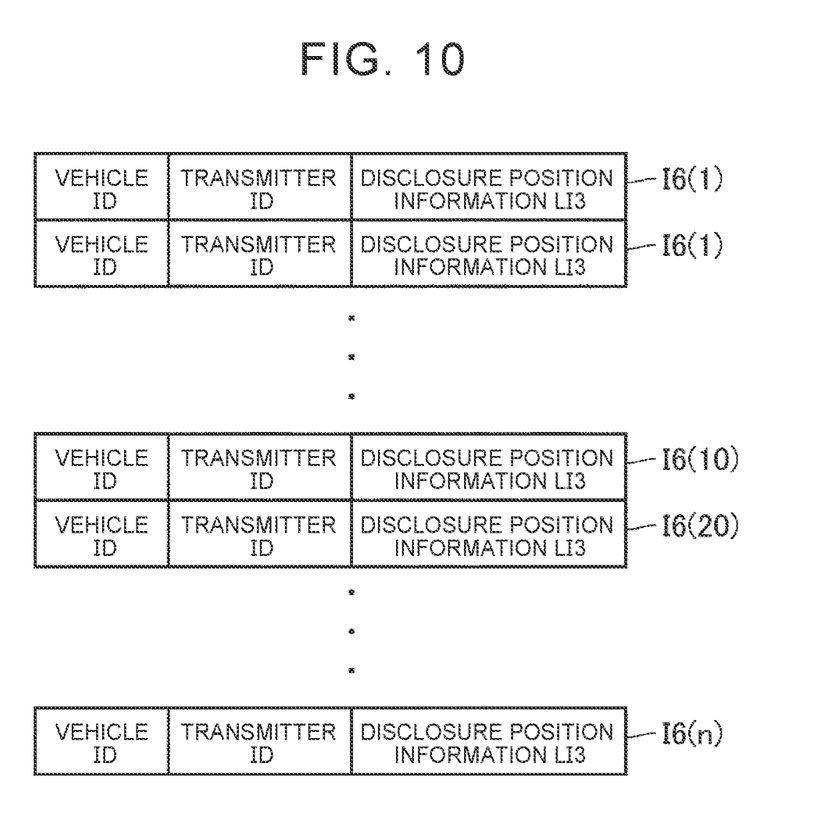
FIG. 10 is a schematic view illustrating pieces of registration information I6(1) to I6(n) stored in a registration information database 312.

Pieces of registration information I6 on vehicles are stored in the registration information database 312. FIG. 10 is a schematic view illustrating pieces of registration information I6(1) to I6(n) stored in the registration information database 312. For example, registration information received from the vehicle 10 is registration information I6(10), and registration information received from the vehicle 20 is registration information I6(20). Each registration information I6 includes the disclosure position information LI3, the vehicle ID, and the transmitter ID.

Figure 11:
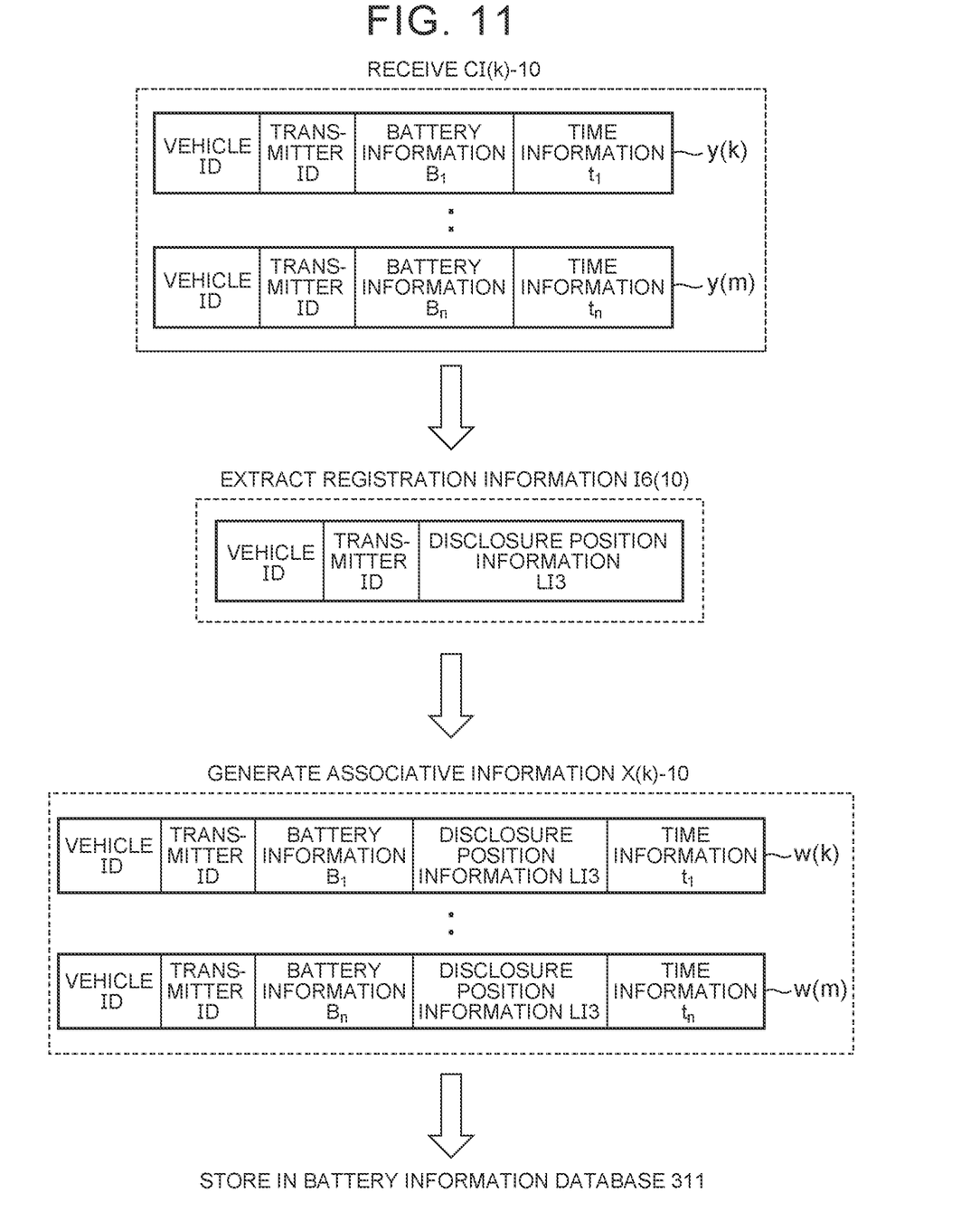
FIG. 11 is a schematic view illustrating a generation course of associative information X.

Next will be described a course after the computing device 300 receives the collected data CI from the vehicle 10 but before the computing device 300 generates associative information X. FIG. 11 is a schematic view illustrating a generation course of the associative information X.

For example, the computing device 300 receives collected data CI(k)-10. Subsequently, the computing device 300 extracts registration information I6(10) including a transmitter ID that coincides with the transmitter ID included in the records y of the collected data CI(k)-10, from the pieces of registration information I6(1) to I6(n) stored in the registration information database 312.

Note that the computing device 300 may extract registration information I6(10) including a vehicle ID that coincides with the vehicle ID included in the records y of the collected data CI(k)-10 from the pieces of registration information I6(1) to I6(n) stored in the registration information database 312.

Subsequently, the computing device 300 generates associative records w by associating the records y with the disclosure position information LI3 in the registration information I6(10).

More specifically, in a case where the collected data CI(k)-10 includes records y(k) to y (m), the computing device 300 generates associative records w(k) to w(m) by associating the disclosure position information LI3 with all the records y(k) to y(m).

As such, the computing device 300 generates associative information X(k)-10 including the associative records w(k) to w(m).

Note that the computing device 300 generates the associative information X every time the computing device 300 receives the collected data CI from the vehicle 10, and the computing device 300 stores the associative information X in the battery information database 311. As such, the vehicle state information on which a disclosure range of an address or the like that is intended by the purchaser 11 is reflected can be generated.

It should be considered that the embodiment described herein is just an example in all respects and is not limitative. The scope of the disclosure is shown by Claims and is intended to include all modifications made within the meaning and scope equivalent to Claims.

What is claimed is:

1. An information collection method for collecting vehicle state information on each of a plurality of vehicles, comprising:
    transmitting identification information and the vehicle state information by a first transmitter, the identification information being information based on which a target vehicle is specified from among the vehicles;
    transmitting disclosure position information and the identification information by a second transmitter, the disclosure position information being set as position information on the target vehicle based on alternative position information and disclosure information, the alternative position information indicating a position of the target vehicle in an alternative manner, the disclosure information indicating a disclosure range to disclose the alternative position information;
    acquiring the identification information, the vehicle state information, and the disclosure position information; and
    associating the vehicle state information with the disclosure position information based on the identification information.

2. The information collection method according to claim 1, wherein the alternative position information is at least either one of an address of a user of the target vehicle and an address of a dealer where the user has purchased the target vehicle.

3. The information collection method according to claim 2, wherein the address of the user and the address of the dealer are expressed by a zip code.

4. The information collection method according to claim 3, wherein the disclosure position information includes information indicating the number of digits of the zip code to be disclosed.

* * * * *